United States Patent
Pillai

(10) Patent No.: US 10,735,261 B2
(45) Date of Patent: Aug. 4, 2020

(54) SMART UPGRADE OF CONNECTED DEVICES IN A MESH NETWORK

(71) Applicant: QUALCOMM Incorporated, San Diego, CA (US)

(72) Inventor: Sunil Pillai, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/033,745

(22) Filed: Jul. 12, 2018

(65) Prior Publication Data

US 2020/0021485 A1  Jan. 16, 2020

(51) Int. Cl.
| | | |
|---|---|---|
| *G06F 8/65* | (2018.01) | |
| *H04L 12/24* | (2006.01) | |
| *H04L 9/32* | (2006.01) | |
| *H04W 84/18* | (2009.01) | |
| *H04W 88/02* | (2009.01) | |
| *H04W 88/08* | (2009.01) | |

(52) U.S. Cl.
CPC .............. *H04L 41/082* (2013.01); *G06F 8/65* (2013.01); *H04L 9/3271* (2013.01); *H04W 84/18* (2013.01); *H04W 88/02* (2013.01); *H04W 88/08* (2013.01)

(58) Field of Classification Search
CPC ....... H04L 41/082; H04L 9/3271; G06F 8/65; H04W 88/08; H04W 88/02; H04W 84/18
See application file for complete search history.

(56) References Cited

U.S. PATENT DOCUMENTS

| | | | |
|---|---|---|---|
| 9,787,800 B2 | 10/2017 | E Costa et al. | |
| 9,917,903 B2 | 3/2018 | Clernon | |
| 2004/0092255 A1 | 5/2004 | Ji et al. | |
| 2005/0229171 A1 | 10/2005 | Henry et al. | |
| 2009/0201851 A1* | 8/2009 | Kruys | H04W 16/14 370/328 |
| 2012/0157089 A1* | 6/2012 | Yang | H04L 41/0645 455/424 |

(Continued)

FOREIGN PATENT DOCUMENTS

CN   105207802 A   12/2015

OTHER PUBLICATIONS

International Search Report and Written Opinion—PCT/US2019/036681—ISA/EPO—dated Oct. 24, 2019 13 pages.

*Primary Examiner* — Lakeram Jangbahadur
(74) *Attorney, Agent, or Firm* — The Marbury Law Group, PLLC

(57) ABSTRACT

Methods of upgrading a mesh network device reduce the amount of memory required on such devices. A network device may identify a neighbor network device in response to receiving a request to perform an upgrade, and send a message configured to cause the neighbor network device to function as a recovery node. The network device may then perform the upgrade without retaining a backup image in memory. If the neighbor network device determines that the upgrade failed based on messages not received from the mesh network device being upgraded, the neighbor network device may recover the network device being upgraded by providing a file corresponding to the upgrade. The neighbor network device may determine that the upgrade failed if no response is received to a challenge message or if no indication of success is received after a time expires.

15 Claims, 11 Drawing Sheets

(56) References Cited

U.S. PATENT DOCUMENTS

| | | | |
|---|---|---|---|
| 2013/0234863 A1* | 9/2013 | Vos | G01D 4/006 |
| | | | 340/870.03 |
| 2014/0007076 A1 | 1/2014 | Kim et al. | |
| 2014/0123123 A1 | 5/2014 | Bahls | |
| 2017/0308705 A1 | 10/2017 | Karaginides et al. | |
| 2017/0317938 A1 | 11/2017 | Abraham et al. | |
| 2018/0199218 A1* | 7/2018 | Ashrafi | H04W 76/10 |
| 2018/0302807 A1* | 10/2018 | Chen | H04L 45/22 |
| 2018/0343567 A1* | 11/2018 | Ashrafi | H04B 7/024 |

* cited by examiner

SMART UPGRADE OF CONNECTED DEVICES IN A MESH NETWORK

BACKGROUND

Computing devices that include wireless communication capabilities are becoming smaller, cheaper, and increasingly ubiquitous. Such computing devices are being incorporated with more and more objects, gradually creating a massively distributed network of computing devices generally referred to as the Internet of Things or the Internet of Everything (IoE). Many types of devices with wireless communication capabilities are expected to participate in the IoE as network mesh network devices using wireless communication.

Occasionally, an IoE device may need to be upgraded. Such upgrades may include one or more revisions to firmware, various software modules and data files of the IoE device, including the operating system, applications, configuration data, raw data, content such as image and/or audio files, and the like. Typically, an upgrade may be delivered Over-The-Air (OTA) via a "device upgrade file."

If an upgrade fails, such as the upgrade file is corrupted, does not load properly or fails to execute after the upgrade is complete, the IoE device may need to be recovered, particularly if the upgrade is to firmware. A conventional approach to facilitating recovery of an IoE device after a failed upgrade involves partitioning memory into two banks so that the upgrade file can be stored in one bank while the current version of the same file is retained in the other bank and switch over to upgrade file is performed only after the upgrade file has been verified to be complete and executable. Thus, one memory bank (e.g., bank A) may contain active software components (e.g., application(s), configuration data, raw data, image and/or audio file(s), operating software, etc.), and the other memory bank (e.g., bank B) may be unused until an upgrade file is received. During an OTA upgrade, upgraded software components from a device upgrade file (and any unchanged software components) may be stored in the unused memory bank (i.e., bank B). Then, after a successful reboot, the IoE device may utilize the formerly unused memory bank containing the upgraded software components (i.e., bank B) as the "active" memory bank and the former "active" memory bank (i.e., bank A) may be erased. If a reboot is unsuccessful and/or the upgrade otherwise fails, the IoE device can continue using the former "active" memory bank (i.e., bank A) as the "active" memory bank.

SUMMARY

Various embodiments include methods for upgrading a mesh network device that identify and use a neighbor mesh network device to function as a recovery node during the upgrade process.

Various embodiments may include identifying a neighbor mesh network device suitable for functioning as a recovery node in preparation for performing an upgrade, sending to the neighbor mesh network device a message configured to cause the neighbor mesh network device to function as a recovery node, performing the upgrade by overwriting a file in memory without retaining a copy, performing a communication with the neighbor mesh network device to determine if the upgrade was successful, and using a recovery file received from the neighbor mesh network device to overwrite the file in the memory in response to determining that the upgrade was unsuccessful.

In some embodiments, identifying a neighbor mesh network device suitable for functioning as a recovery node may include determining whether the neighbor mesh network device is performing an upgrade, determining whether a version of a file stored in a memory of the neighbor mesh network device and corresponding to the upgrade by the mesh network device is older than a version of the file being upgraded in response to determining that the neighbor mesh network device is not performing an upgrade, and initiating an upgrade of the neighbor mesh network device by the mesh network device in response to determining that the version of the file stored in the memory of the neighbor mesh network device is older than the version of the file being upgraded.

In some embodiments, initiating an upgrade of the neighbor mesh network device may include sending an internodal upgrade file, including the file being upgraded, to the neighbor mesh network device.

In some embodiments, performing a communication with the neighbor mesh network device to determine if the upgrade was successful may include receiving a challenge message from the neighbor mesh network device and transmitting a challenge response message to the neighbor mesh network device in response to receiving the challenge message. Such embodiments may further include providing within the challenge response message information usable by the neighbor mesh network device for authenticating the challenge response message or the mesh network device.

Further embodiments may include the neighbor mesh network device receiving the message configured to cause the neighbor mesh network device to function as a recovery node, sending a challenge message after expiration of a time indicated in a timeout value included in the message, determining whether a challenge response message is received from the mesh network device, and in response to determining that the challenge response message is not received from the mesh network device, sending a device recovery file including a version the same as or newer than the version of the file being upgraded from the neighbor mesh network device to the mesh network device.

In some embodiments, performing a communication with the neighbor mesh network device to determine if the upgrade was successful may include transmitting an indication of upgrade success message to the neighbor mesh network device upon completing the upgrade. Such embodiments may further include providing within the indication of upgrade success message information usable by the neighbor mesh network device for authenticating the indication of upgrade success message or the mesh network device.

Further embodiments may include receiving the message configured to cause the neighbor mesh network device to function as a recovery node, determining whether an indication of upgrade success message is received from the mesh network device before expiration of a time indicated in a timeout value included in the message, and in response to determining that an indication of upgrade success message is not received from the mesh network device before expiration of the time indicated in the timeout value, sending a device recovery file including a file having a version the same as or newer than the version being overwritten from the neighbor mesh network device to the mesh network device.

In some embodiments, using a recovery file received from the neighbor mesh network device to overwrite a file in the memory in response to determining that the upgrade was unsuccessful may include receiving a device recovery file including a file having a version the same as or newer than the version being upgraded from the neighbor mesh network device, and recovering the mesh network device by overwriting the file from the device recovery file in a memory of the mesh network device.

Various embodiments may include methods executed by a mesh network device to recover a neighbor mesh network device performing an upgrade. Such embodiments may include receiving a message configured to cause a mesh network device to function as a recovery node for a neighbor mesh network device, determining whether an upgrade of the neighbor mesh network device succeeded based upon receiving a message from the neighbor mesh network device, and sending a device recovery file to the neighbor mesh network device in response to determining that the upgrade of the neighbor mesh network device did not succeed.

In some embodiments, determining whether the upgrade of the neighbor mesh network device succeeded based upon receiving a message from the neighbor mesh network device may include sending a challenge message to the neighbor mesh network device upon expiration of a time indicated in a timeout value, determining whether a challenge response message is received from the neighbor mesh network device, determining that the upgrade of the neighbor mesh network device succeeded in response to receiving the challenge response message, and determining that the upgrade of the neighbor mesh network device did not succeed in response to not receiving the challenge response message.

In some embodiments, sending the challenge message to the neighbor mesh network device may include generating information usable for authenticating a challenge response message or the neighbor mesh network device and including the generated information in the challenge message sent to the neighbor mesh network device. Such embodiments may further include attempting to authenticate the challenge response message or the neighbor mesh network device using information included in the challenge response message, and determining that the upgrade of the neighbor mesh network device did not succeed in response to not authenticating the challenge response message or the neighbor mesh network device.

In some embodiments, determining whether the upgrade of the neighbor mesh network device succeeded based upon receiving a message from the neighbor mesh network device may include determining whether an indication of upgrade success message is received from the neighbor mesh network device before expiration of a time indicated in a timeout value and determining that the upgrade of the neighbor mesh network device succeeded in response to receiving the indication of upgrade success message before expiration of the time indicated in the timeout value.

Some embodiments may further include attempting to authenticate the indication of upgrade success message or the neighbor mesh network device using information included in the indication of upgrade success message, and determining that the upgrade of the neighbor mesh network device did not succeed in response to not authenticating the indication of upgrade success message or the neighbor mesh network device.

In some embodiments, sending a device recovery file to the neighbor mesh network device may include creating the device recovery file, including a file corresponding to the upgrade by the neighbor mesh network device, and sending the device recovery file to the neighbor mesh network device.

Further embodiments include a mesh network device including a processor configured with processor-executable instructions to perform operations of any of the methods summarized above. Further embodiments include a non-transitory processor-readable storage medium having stored thereon processor-executable software instructions configured to cause a processor to perform operations of any of methods summarized above. Further embodiments include a mesh network device that includes means for performing functions of any of methods summarized above.

BRIEF DESCRIPTION OF THE DRAWINGS

The accompanying drawings, which are incorporated herein and constitute part of this specification, illustrate various embodiments, and together with the general description given above and the detailed description given below, serve to explain the features of various embodiments.

DETAILED DESCRIPTION

Figure 1:
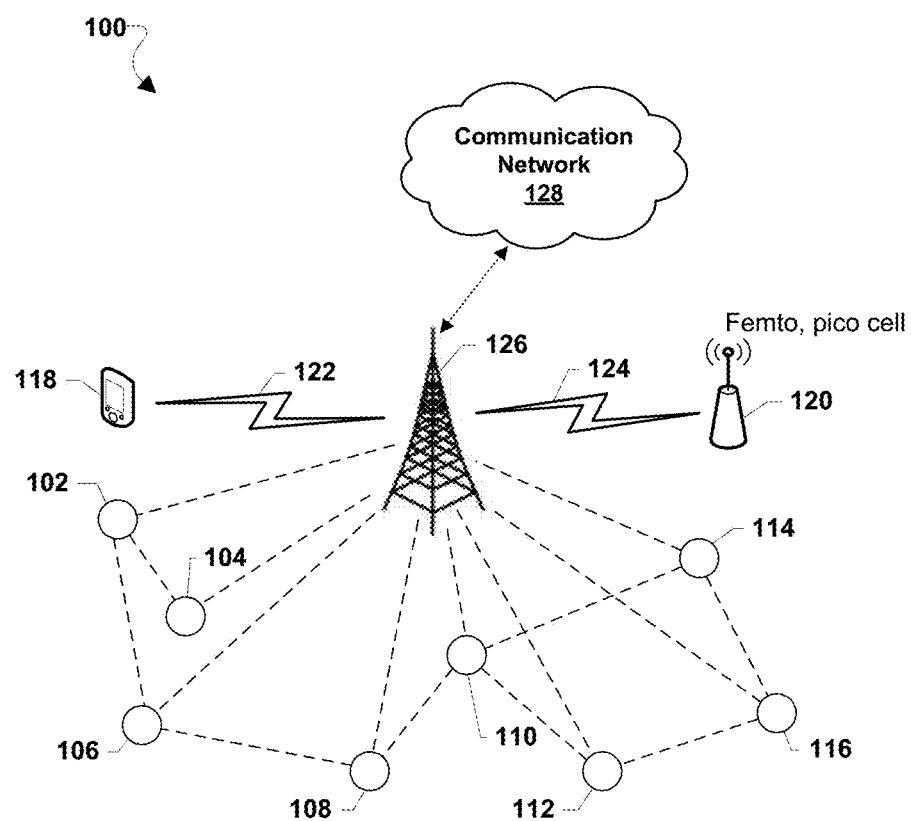
FIG. 1 is a system block diagram of a communication environment in which the various embodiments may be used.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Various embodiments provide methods for upgrading a mesh network device and recovering a neighbor network device without requiring additional unused memory capacity. In particular, a mesh network device requiring an upgrade may identify a neighboring backup mesh network device that is suitable for functioning as a recovery node (referred to herein as a "neighbor mesh network device," a "neighbor IoE device," a "recovery mesh network device" or a "recovery IoE device") and inform the identified recovery mesh network device that it will serve as a recovery node, before performing the upgrade. In response to determining the upgrade to the mesh network device is unsuccessful, the recovery mesh network device may provide a recovery file to the mesh network device. By using a neighboring mesh network device as a recovery node, mesh network devices requiring over-the-air upgrades may be equipped with smaller memories or may use larger operating files because the memory space does not have to be reserved for a backup or recovery file. Various embodiments may enable upgrading a variety of file types in mesh network devices. For example, various embodiments may enable upgrading firmware of a mesh network device. As another example, various embodiments may enable upgrading an application or application software of a mesh network device. As another example, various embodiments may enable upgrading configuration data of a mesh network device. As another example, various embodiments may enable upgrading various content stored on a mesh network device.

The term "IoE device" is used herein to refer to a wireless device that may use radio frequency (RF) communications to communicate with another device (or user), for example, as a participant in a communication network, such as the IoE. Such communications may include communications with another wireless device, a base station (including a cellular communication network base station and an IoE base station), an access point (including an IoE access point), or other wireless devices. In various embodiments, an IoE device may be configured to communicate with other IoE devices to form a mesh network of devices.

Devices implementing various embodiments may include any of a variety of IoE type devices, such as smart appliances (including televisions, set top boxes, kitchen appliances, lights and lighting systems), smart electricity meters, air conditioning/HVAC systems, thermostats, building security systems including door and window locks, vehicular entertainment systems, vehicular diagnostic and monitoring systems, unmanned and/or semi-autonomous aerial vehicles, automobile components, sensors, machine-to-machine devices, and similar devices that include a programmable processor and memory and circuitry for establishing wireless communication pathways and transmitting/receiving data via wireless communication pathways.

The term "component" is intended to include a computer-related part, functionality or entity, such as, but not limited to, hardware, firmware, a combination of hardware and software, software, or software in execution, that is configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

During a conventional upgrade process, an IoE device may receive an upgrade Over-The-Air (OTA) in the form of a device upgrade file, such as a firmware file. The contents of the device upgrade file may be stored in a partition of memory of the IoE device that is currently inactive. To complete the upgrade, the IoE device may perform a reboot and, during the reboot, identify the currently inactive portion of memory as active and a formerly active portion of memory as inactive. If the reboot is successful, the newly inactive portion of memory may be erased in preparation for a future upgrade. However, this process is an inefficient use of memory and increases costs associated with an IoE device because a large portion of the memory is unusable except during the OTA upgrade.

Various embodiments provide methods implemented by a processor on an IoE device for upgrading files stored on the IoE device (e.g., firmware) that do not require extra unused memory. Various embodiments also provide methods implemented by a processor on an IoE device for recovering a neighboring IoE device in the event of an unsuccessful upgrade of the neighboring IoE device.

When an IoE device receives a request (e.g., from an upgrade source) to perform an OTA upgrade, the IoE device may identify a neighboring IoE device that is suitable for functioning as a recovery node. In identifying a suitable neighboring IoE device, the IoE device may identify a neighboring IoE device that is not performing an upgrade and determine whether that neighboring IoE device has the same or a newer version of the file being overwritten on the IoE device. If the identified neighboring IoE device has an older version of the file than the file on the IoE device or does not have a copy of the file, the IoE device may select a different neighboring IoE device or initiate an internodal upgrade of the neighboring IoE device. The IoE device may initiate the internodal upgrade by creating an internodal upgrade file containing the same version of the file as being overwritten on the IoE device (e.g., the file that is about to be upgraded) and sending the internodal upgrade file to the recovery node IoE device. Upon receipt of the internodal upgrade file, the recovery node IoE device may perform an upgrade so that the recovery node IoE device will have the same version of the file being overwritten on the IoE device.

Having identified or upgraded a neighboring IoE device suitable for functioning as a recovery node, the IoE device may send an encrypted message containing a timeout value to the recovery node IoE device. The encrypted message may prompt the recovery node IoE device to "check-in" on the IoE device after the timeout value has expired. In some embodiments, the encrypted message may include information that the recovery node IoE device can use to communicate with and/or recognize a reply message from the IoE device. In some embodiments, the encrypted message may include an encryption/decryption key to be known only by the two devices for use in encrypting/decrypting a check in message and the reply message. In some embodiments, information between the IoE device and recovery node IoE device for securing or authenticating check in and reply messages maybe exchanged during handshaking-like messages exchanged after (e.g., in response to) the encrypted message is received by the recovery node IoE device.

The IoE device may then receive a device upgrade file (e.g., firmware) from an upgrade source, such as after indicating to the upgrade source that the IoE device is ready to perform the upgrade. The IoE device may then perform the upgrade by overwriting a file currently stored in memory of the IoE device with newer version obtained from the device upgrade file. That is, during the upgrade according to various embodiments, the file being upgraded is replaced (e.g., overwritten) with the upgrade file without retaining the current version of the file in memory as a backup.

Meanwhile, the recovery node IoE device may be waiting the amount of time indicated in the timeout value received from the IoE device before starting the upgrade. When that time expires, the recovery node IoE device may send a challenge message to the IoE device requesting a reply to indicate that the upgrade was successfully accomplished. In some embodiments, the challenge message may include an alphanumeric string randomly generated by the recovery node IoE device. In some embodiments, the challenge message may be encrypted. In some embodiments, this encryption may be performed using a symmetric key shared between the IoE device and the recovery node IoE device, while in other embodiments this encryption may be performed using a public key of the IoE device.

If the IoE device is able to successfully perform the upgrade, the IoE device will receive the challenge message from the recovery node IoE device and send back a suitable challenge response message. Receipt of this challenge response message will inform the recovery node IoE that the upgrade was successful. In some embodiments, the challenge message may be encrypted, and the IoE device may decrypt the challenge message (e.g., using a private key of the IoE device or a symmetric key exchanged prior to the upgrade procedure). In such embodiments, the IoE device may send back a challenge response message configured using information encrypted in the challenge message so that the recovery node IoE device is informed that the IoE device is functioning properly or that the replying device is the IoE device undergoing the upgrade. In some embodiments, the IoE device may extract an alphanumeric string from the challenge message and encrypt the alphanumeric string (or some hash of the string) using an encryption key (e.g., a symmetric key) shared between the IoE device and the recovery node IoE device before the upgrade. In such embodiments, the IoE device may create a challenge response message that includes the encrypted alphanumeric string, and the recovery node IoE device may authenticate the upgraded IoE device to verify that the device is operating properly.

Receipt of the challenge response message informs the recovery node IoE device that the upgrade was successful, so no actions to recover the IoE device are required. Upon receipt of the challenge response message from the IoE device, the recovery node IoE device may examine the message to determine whether the message was sent by the IoE device being upgrade and whether the IoE device is operating properly. In some embodiments, the recovery node IoE device may decrypt the challenge response message using a private key of the IoE device, while in other embodiments the recovery node IoE device may decrypt the challenge response message using a symmetric key exchanged between the devices prior to the upgrade procedure. In some embodiments, the recovery node IoE device may extract an encrypted alphanumeric string from the challenge response message, decrypt the encrypted alphanumeric string (e.g., using a symmetric key shared between the devices before the upgrade), and compare the decrypted string to the alphanumeric string randomly generated by the recovery node IoE device. If the two strings match, the recovery node IoE device may determine that the IoE device successfully performed the upgrade and is operating properly.

If the recovery node IoE does not receive a challenge response message from the IoE device or is unable to verify or authenticate a received challenge response message, the recovery node IoE device may initiate a recovery of the IoE device using the file stored in memory, such as by creating a recovery file containing the file from memory of the recovery node IoE device and sending the recovery file to the IoE device. In that situation, the IoE device may receive the recovery file from the recovery node IoE device, and overwrite the memory of the IoE device with the recovery file and complete recovery of the IoE device.

The various embodiments enable a mesh network device to perform an upgrade by directly replacing the file in memory of the mesh network device while using a neighboring mesh network device as a source of the recovery file. At the same time, the neighboring mesh network device may determine whether the upgrade was successful and provide the recovery file if the upgrade was unsuccessful. As such, each mesh network device may only need sufficient memory capacity to store the active file, thus avoiding extra cost and inefficiencies. Further, recovery duties of the recovery node IoE device may be limited to monitoring a timer set to the timeout value, transmitting the challenge message and verifying a challenge response message, as operations to recover the IoE device may only be performed if a suitable challenge response message is not received.

Alternative mechanisms for informing the recovery node IoE device of the success or failure of the IoE device upgrade may be employed in some embodiments. For example, in some embodiments, the IoE device may transmit a message (e.g., an "I'm OK" message) to the recovery node IoE device upon completing the upgrade (i.e., instead of in response to a challenge message), the recovery node IoE device may wait for this message for the predetermined waiting time (timeout value) and initiate a recovery if the wait time expires before receiving the I'm OK message.

Various embodiments may be implemented in one or more mesh network devices, such as an IoE device, that may operate within a variety of communication environments, an example of which is illustrated in FIG. 1. A communication environment 100 may include a plurality of IoE devices, such as IoE devices 102-116, which may transmit and receive RF signals that propagate through the communication environment 100. Each IoE device 102-116 may communication with at least one other IoE device 102-116 over one or more wired or wireless communication links (illustrated with dashed lines). In some embodiments, the IoE devices 102-116 may function as an IoE mesh network. As such, in some embodiments, the IoE devices 102-116 may be participants in a massively distributed computing network. In some mesh networks, one of the IoE devices 102-116 may function as a master mesh network device capable of issuing instructions to one or more other IoE devices.

Each IoE device 102-116 may also communicate with a network base station 126 over one or more wired or wireless communication links. The network base station 126 may provide access to a communication network 128 (e.g., the Internet) for the IoE devices 102-116, either through direct communication with the network base station 126 or indirectly (e.g., "daisy chained") through one or more of the IoE devices 102-116.

The network base station 126 may include a cellular network base station, which may support communications for a variety of other wireless communication devices. Such wireless communication devices may include mobile communication devices 118, which may communicate with the base station 126 over a communication link 122. Such wireless communication devices may also include small cells or a wireless access points 120, which may include a micro cell, a femto cell, a pico cell, a Wi-Fi access point, and other similar network access points. The mobile communication devices 118 and wireless access points 120 may communicate with the base station over a wireless communication link 124.

Wireless communication links among the IoE devices 102-116 and between the IoE devices and the base station 126 may be implemented using a plurality of carrier signals, frequencies, or frequency bands, each of which may include a plurality of logical channels. Wireless communication links may utilize one or more radio access technologies (RATs). Examples of RATs that may be used in one or more of the various wireless communication links within the communication environment 100 include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication environment 100 include medium range protocols such as Wi-Fi, LTE-U, LTE-Direct, LAA, MuLTEfire, and relatively short range RATs such as Wi-Fi, ZigBee, Bluetooth, and Bluetooth Low Energy (LE). In some embodiments, some of the communication links may use an IoE communication protocol. An IoE communication protocol may include LTE Machine-Type Communication (LTE MTC), Narrow Band LTE (NB-LTE), Cellular IoT (CIoT), Narrow Band IoT (NB-IoT), BT Smart, Bluetooth Low Energy (BT-LE), Institute of Electrical and Electronics Engineers (IEEE) 802.15.4, and extended range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. In some embodiments, the frequencies used for wireless communication links may be in the 3.5 GHz band.

Thus, the communication environment 100 may include a wide variety of communication links with the network base station 126, including various wired or wireless communication links with the IoE devices 102-116, as well as with the mobile communication devices 118 and the small cells 120.

Figure 2:
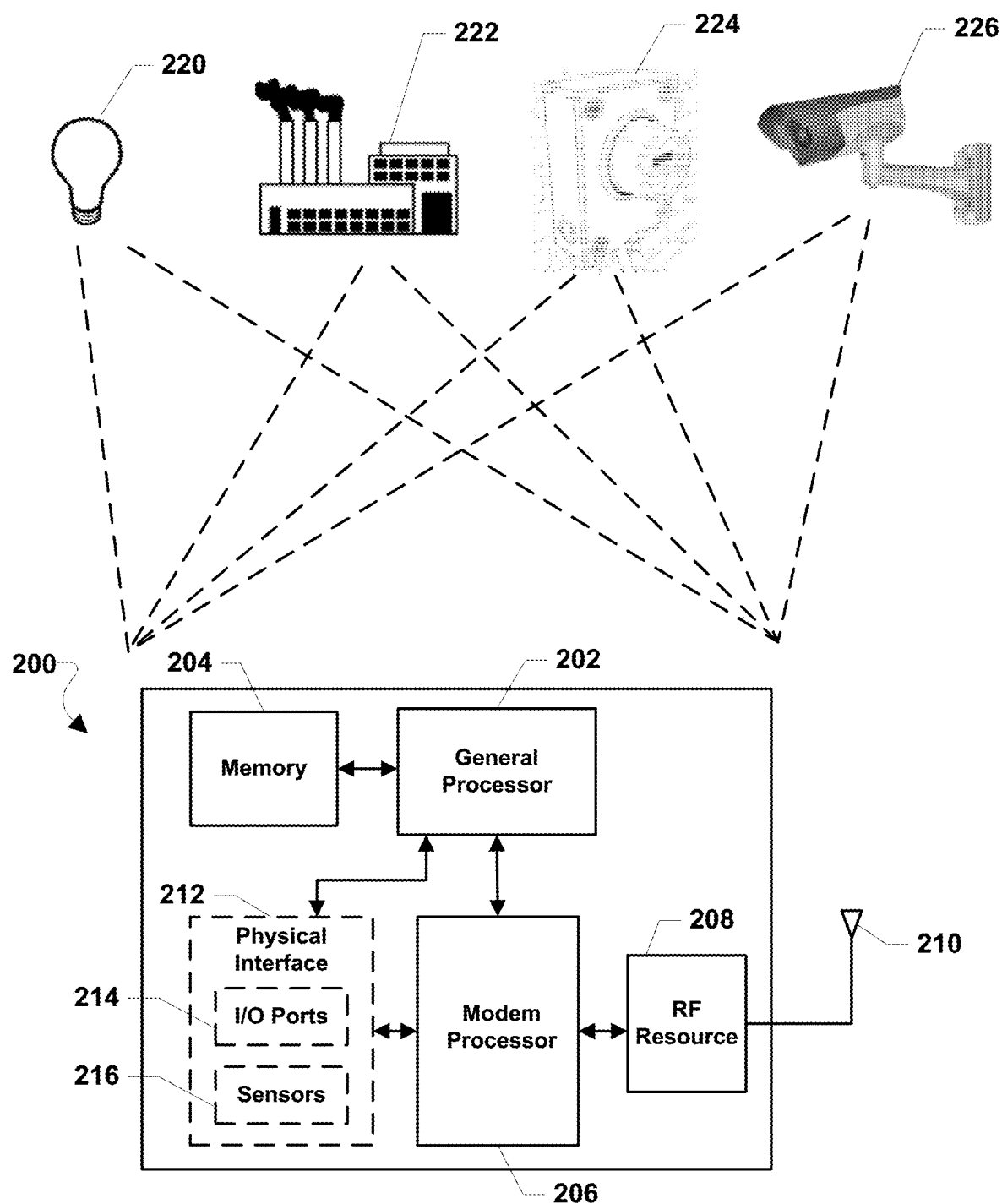
FIG. 2 is a component block diagram illustrating a wireless network mesh network device suitable for use with various embodiments.

FIG. 2 is a component block diagram of an IoE device 200 suitable for implementing various embodiments. In various embodiments, the IoE device 200 may be similar to the IoE devices 102-116 shown in FIG. 1. IoE device 200 may be built into a variety of devices, including wireless access points supporting local wireless networks, smart appliances communicating with wireless networks, and any of a variety of industrial, scientific, or military mesh network devices. Non-limiting examples of smart appliances include televisions, set top boxes, kitchen appliances, lights and lighting systems, smart electricity meters, air conditioning/HVAC systems, thermostats, building security systems, doors and windows, door and window locks, and building diagnostic and monitoring systems. An IoE device 200 may also be in communication with, or coupled to, a system, device, or structure. Non-limiting examples of systems that may implement IoE devices 200 include a lighting system 220, one or more components or elements in a factory 222, a smart meter or power monitoring system 224, and a residential or commercial security system 226.

An IoE device 200 may include at least one processor 202, which may be coupled to at least one memory 204. The memory 204 may be a non-transitory computer-readable storage medium that stores processor-executable instructions. The memory 204 may store an operating system, user application software, and/or other executable instructions. The memory 204 may also store application data, such as an array data structure. The memory 204 may include one or more caches, read only memory (ROM), random access memory (RAM), electrically erasable programmable ROM (EEPROM), static RAM (SRAM), dynamic RAM (DRAM), or other types of memory. The processor 202 may read and write information to and from the memory 204. The memory 204 may also store instructions associated with one or more protocol stacks. A protocol stack generally includes computer executable instructions to enable communication using a radio access protocol or communication protocol.

The processor 202 and the memory 204 may communicate with at least one modem processor 206. The modem processor 206 may perform modem functions for communications with one or more other IoE devices, access points, base stations, and other such devices. The modem processor 206 may be coupled to an RF resource 208. The RF resource 208 may include various circuitry and components to enable the sending, receiving, and processing of radio signals, such as a modulator/demodulator component, a power amplifier, a gain stage, a digital signal processor (DSP), a signal amplifier, a filter, and other such components. The RF resource 208 may be coupled to a wireless antenna (e.g., a wireless antenna 210). The IoE device 200 may include additional RF resources and/or antennas without limitation. The RF resource 208 may be configured to provide communications using one or more frequency bands via the antenna 210.

In some embodiments, the processor 202 may also communicate with a physical interface 212 configured to enable a wired connection to another device or a network. The physical interface 212 may include one or more input/output (I/O) ports 214 configured to enable communications with the device to which the IoE device is connected. The physical interface 212 may also include one or more sensors 216 to enable the IoE device to detect information about a device with which the IoE device 200 is connected via the physical interface 212.

The IoE device 200 may also include a bus for connecting the various components of the IoE device 200 together, as well as hardware and/or software interfaces to enable communication among the various components. The IoE device 200 may also include various other components not illustrated in FIG. 2. For example, the IoE device 200 may include a number of input, output, and processing components, such as buttons, lights, switches, antennas, display screen or touchscreen, various connection ports, additional processors or integrated circuits, and many other components.

Figure 3A:
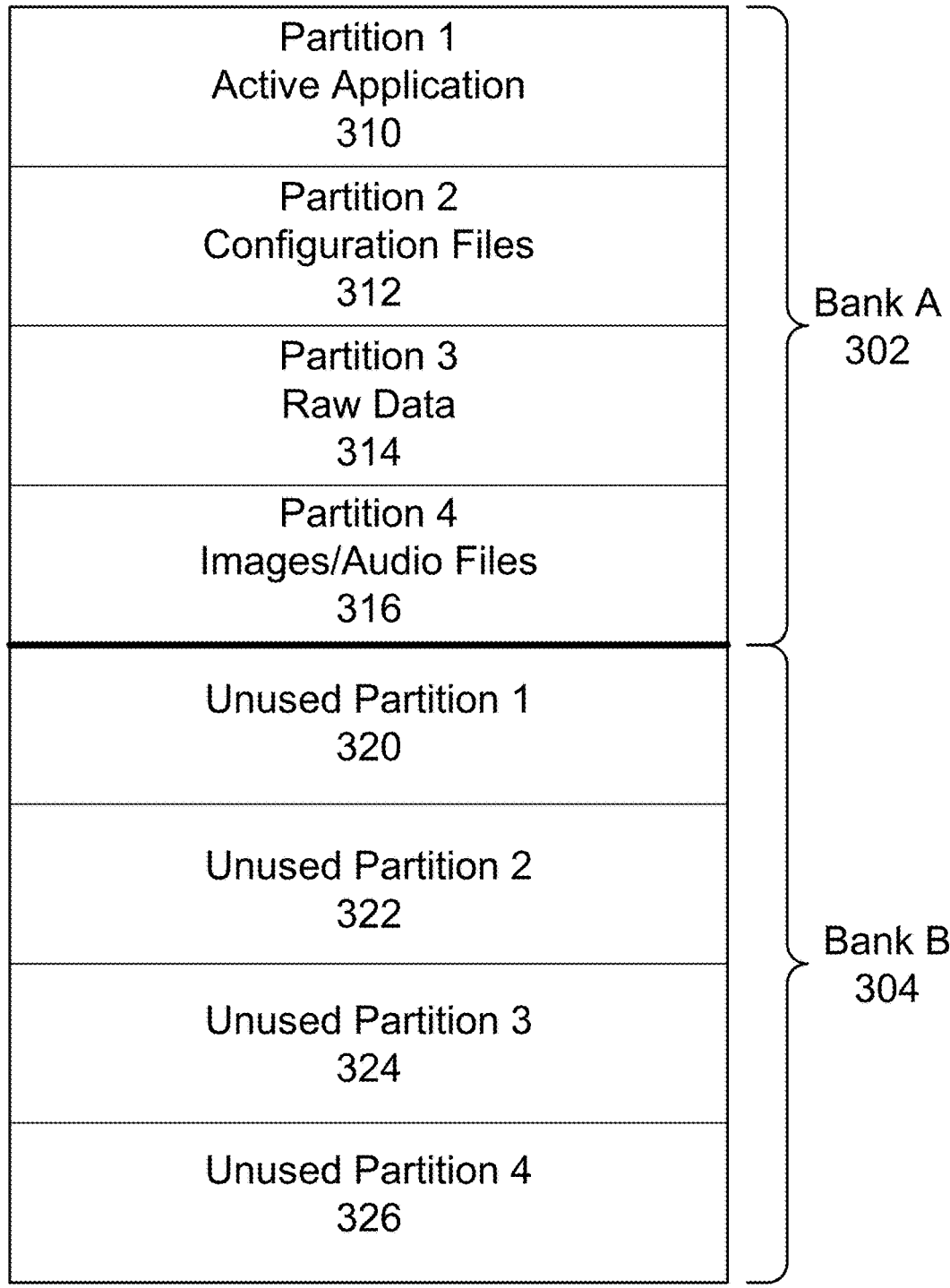
FIGS. 3A-3C are component block diagrams illustrating a memory resource of an Internet of Everything (IoE) device according to a prior art upgrade method.
Figure 3B:
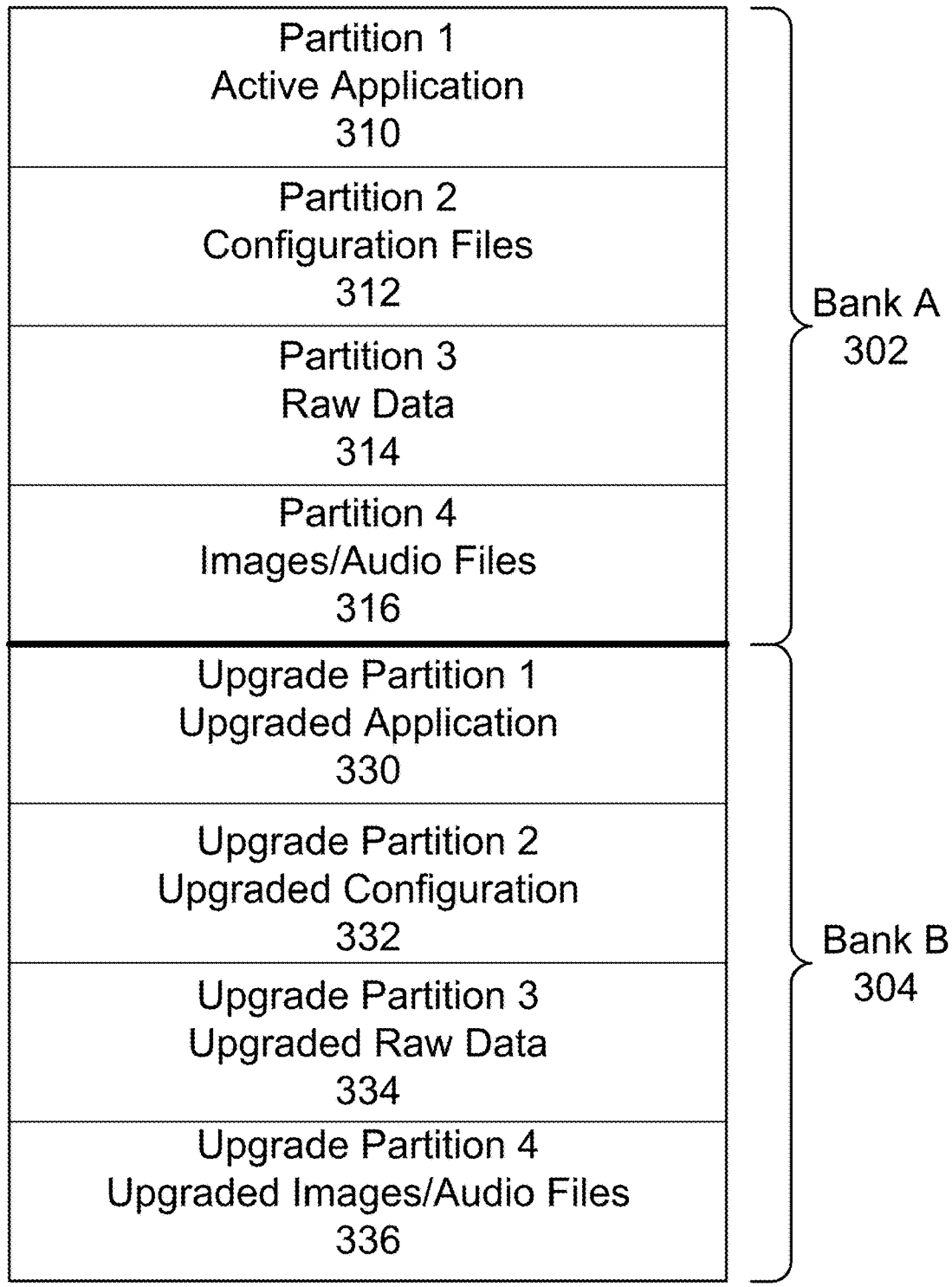

FIGS. 3A-3B are component block diagrams illustrating a memory resource 300 of an Internet of Everything (IoE) device for use in a conventional upgrade method. The memory resource 300 of FIGS. 3A-3B may take the same as the memory 204 in the IoE device 200 of FIG. 2.

In various prior art embodiments, the memory resource 300 may include two memory banks 302, 304. In FIG. 3A, the memory bank A 302 is shown as an "active" memory bank and the memory bank B 304 is shown as an "unused" memory bank. The memory bank A 302 may include partitions 1-4, 310-316. For example, the partition 1 310 may include an active application or firmware, the partition 2 312 may include configuration files, the partition 3 314 may include raw data, and the partition 4 316 may include image and/or audio files. The memory bank B 304 may include unused partitions 1-4 320-324.

In FIG. 3B, the memory bank B 304 is shown as an "upgrade" memory bank. The memory bank B 304 may include upgrade partitions 1-4 330-336. The upgrade partition 1 330 may include an upgraded application or firmware, the upgrade partition 2 332 may include upgraded configuration files, the upgrade partition 3 334 may include upgraded raw data, and the upgrade partition 4 336 may include upgraded content such as image and/or audio files. That is, the various upgrade partitions in the upgrade memory bank may include an upgraded version of the file.

Figure 3C:
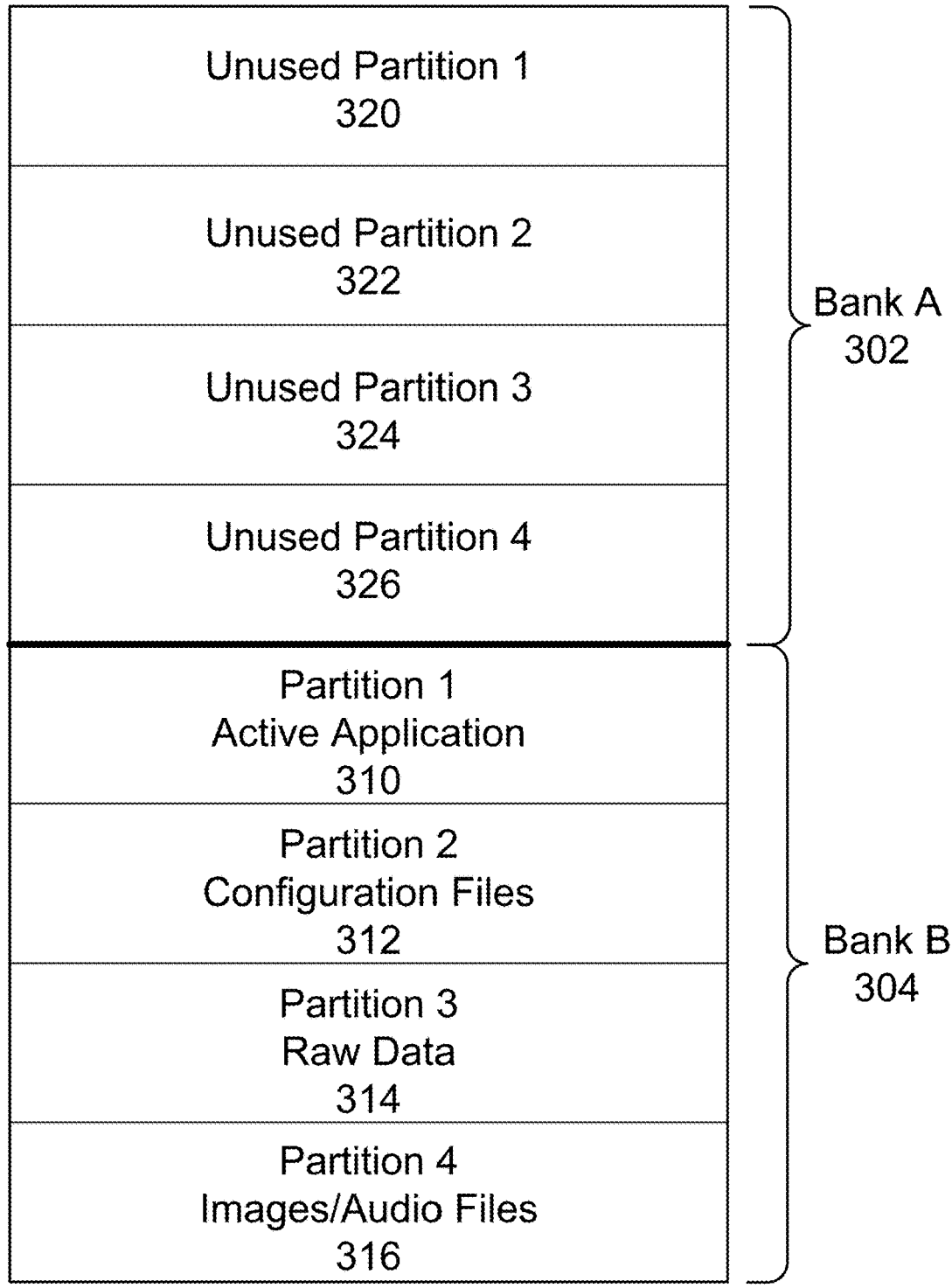

As shown in FIG. 3C, the memory bank B 304 has become the "active" memory bank and the memory bank A 302 has become the "unused" memory bank. For example, the upgraded application in upgrade partition 1 330 of FIG. 3B is now the active application or firmware in partition 1 310 of FIG. 3C. As shown in FIGS. 3A-3B, the upgraded file is stored in an "upgrade" memory bank, which becomes the "active" memory bank as part of the upgrade process. In addition, the former "active" memory bank is erased and becomes an "unused" memory bank after a successful upgrade. However, as can be seen, this prior art approach to performing an upgrade of a mesh network device requires a memory resource with twice the capacity.

Figure 4A:
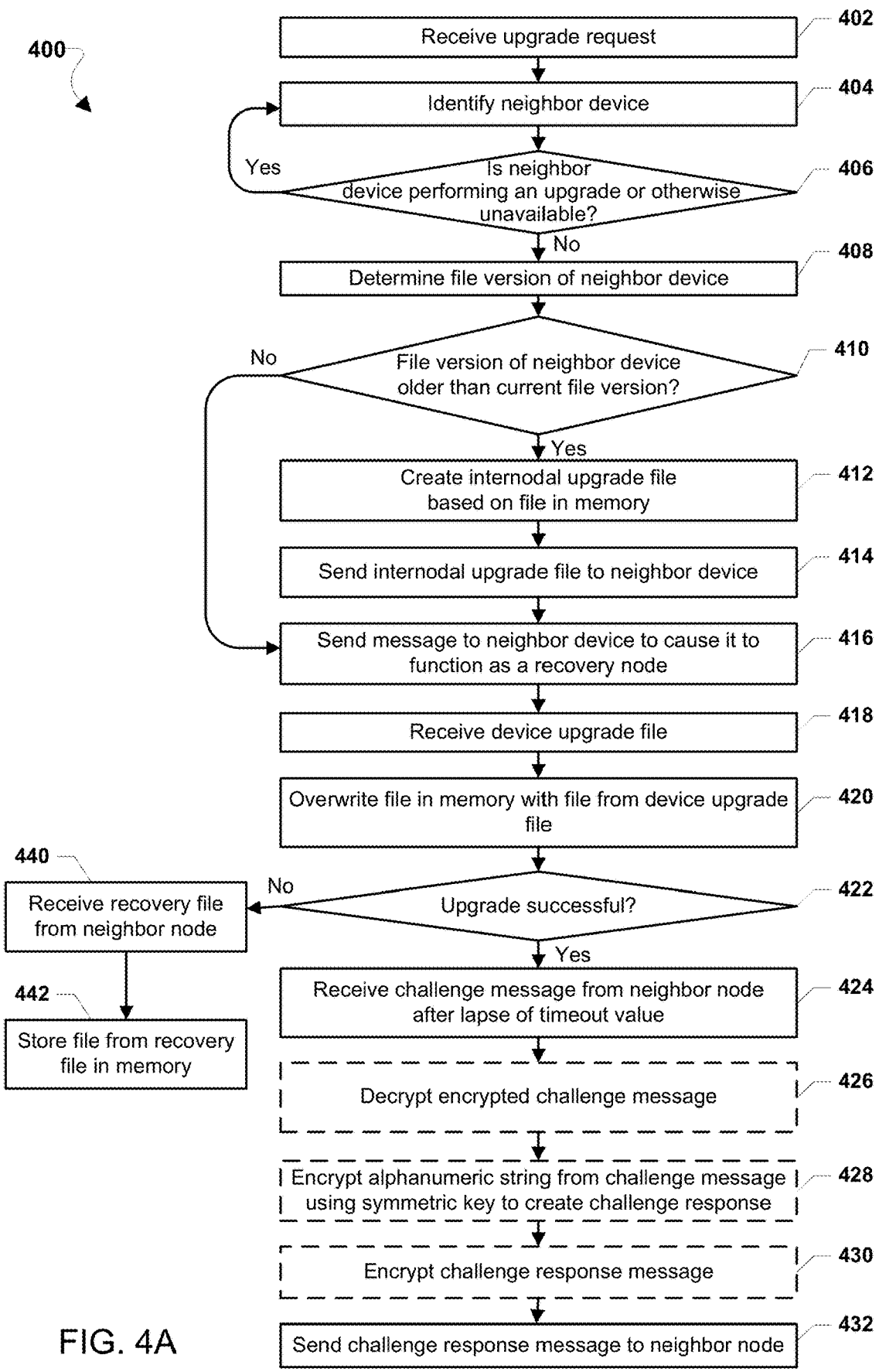
FIG. 4A is a process flow diagram illustrating a method for upgrading an IoE device according to various embodiments.

FIG. 4A is a process flow diagram illustrating a method 400 for upgrading a file of a mesh network device according to some embodiments. In some embodiments, the method 400 may be implemented when upgrading firmware of the mesh network device. In some embodiments, the method 400 may be implemented when upgrading an application of the mesh network device. In some embodiments, the method 400 may be implemented when upgrading configuration data of the mesh network device. In some embodiments, the method 400 may be implemented when upgrading various content stored on a mesh network device. With reference to FIGS. 1-4A, the method 400 may be implemented by a device processor (e.g., the processor 202 or another similar processor) of an IoE device (e.g., the IoE devices 102-116 and 200).

In block 402, the device processor may receive an upgrade request from a source of upgrades. In some embodiments, the upgrade request may be sent by a network hub or another mesh network device. In various embodiments, the upgrade request may be an indication that an upgrade (e.g., an upgrade of firmware, application software, configuration data, content, etc.) is available that serves to prompt the device processor to perform an upgrade.

In block 404, the device processor may identify a neighbor mesh network device. For example, the device processor may send a broadcast message and wait to receive any broadcast replies from mesh network.

In determination block 406, the device processor may determine whether the identified neighbor mesh network device is performing an upgrade or is otherwise unavailable or unsuitable to function as a recovery node. For example, if the identified neighbor mesh network device is not configured with the file being upgraded and the file cannot be provided by an internodal upgrade (e.g., in blocks 412 and 414), the device may not be suitable to function as a recovery node. If the neighbor mesh network device is performing an upgrade (i.e., determination block 406="Yes"), the device processor may identify another neighbor mesh network device in block 404. In some embodiments, the device processor may determine that the identified neighbor mesh network device is not suitable to function as a recovery node in determination block 406 and identify another neighbor mesh network device in block 404 if the identified neighbor mesh network device is not configured with the file being upgraded. For example, it may be infeasible to perform an internodal upgrade when the file being upgraded is mission-critical firmware and the identified neighbor mesh network device is executing different firmware. As another example, an internodal upgrade may be feasible if the file being upgraded is a data file or application that can be stored in memory without interrupting functioning of the identified neighbor mesh network device. Thus, in some situations and embodiments, the device processor may not select another neighbor mesh network device if the identified neighbor mesh network device is not configured with the file being upgraded, and instead push the file to the currently selected neighbor mesh network device in an internodal upgrade in blocks 412 and 414 as described below.

In response to determining that the neighbor mesh network device is not performing an upgrade (i.e., determination block 406="No"), the device processor may determine a file version of the neighbor mesh network device in block 408. For example, the device processor may send a query to the neighbor mesh network device asking for the version of the file (e.g., firmware, application software, configuration data, content, etc.) to be upgraded and await a query response from the neighbor mesh network device. The operation in block 408 may not be performed in situations in which the identified neighbor mesh network device is not configured with the file being upgraded but the file is suitable for being provided in an internodal upgrade.

In determination block 410, the device processor may determine whether the file version of the neighbor mesh network device is older than a current file version of the device if the file exists at the neighbor mesh network device. For example, the device may be executing version 1.4 of operating software stored in memory while the neighbor mesh network device may have version 1.3 of the operating software stored in memory of the neighbor mesh network device. In this example, the neighbor mesh network device would not be suitable for acting as a recovery node because of the older file version. However, if the neighbor mesh network device has the operating software with version 1.4 (or newer), then the neighbor mesh network device would be suitable to function as a recovery node for the device conducting the upgrade.

In response to determining that the neighbor mesh network device has an older file version (i.e., determination block 410="Yes"), the device processor may create an internodal upgrade file based on the file in memory of the device in block 412. For example, if the device has a file with version 1.4 in memory, the device processor would create the internodal upgrade file to include the file with version 1.4. In some embodiments, the device processor may create the internodal upgrade file by including all of the file from the active memory of the device. In other embodiments, the device processor may create the internodal upgrade file by including only the part of the file that is to be upgraded as part of the requested upgrade. In some situations and embodiments, if the identified neighbor mesh network device is not configured with the file being upgraded but the file is suitable for being provided in an internodal upgrade, the device processor may create an internodal upgrade file based on the file in memory of the device in block 412.

In block 414, the device processor may send the internodal upgrade file to the neighbor mesh network device. In various embodiments, sending the internodal upgrade file to the neighbor mesh network device may prompt the neighbor mesh network device to perform an internodal upgrade. For example, as discussed further below with reference to FIG. 5A, the neighbor mesh network device may receive the internodal upgrade file and overwrite the file in memory of the neighbor mesh network device (e.g., file having an older version) with the file from the internodal upgrade file. In this way, the device processor may ensure that the neighbor mesh network device selected to function as a recovery node has the same or a newer version of the file as the device being upgraded.

In response to determining that the neighbor mesh network device does not have an older file version (i.e., determination block 410="No"), the device processor may send a message to the neighbor mesh network device to cause it to function as a recovery node in block 416. The message may include a command, symbol or information that is configured to notify the neighbor mesh network device that it is to function as a recovery node for the device performing the upgrade. In some embodiments, the device processor may encrypt the message as part of the operations in block 416 before the message is sent to the neighbor mesh network device. In some embodiments, the device processor may encrypt the message using a public key of the neighbor mesh network device. In some embodiments, the device processor may encrypt the message using a symmetric key shared between the device and the neighbor mesh network device.

In some embodiments, the message sent in block 416 may include a timeout value, which may be an amount of time necessary for the device processor to complete the file upgrade and return to normal operations. In some embodiments, the timeout value may be based on information provided by the source of the upgrade (e.g., hub or other mesh network device within the mesh network), such as the size or complexity of the upgrade, or a timeout value that has been predetermined to be appropriate for the upgrade.

In block 418, the device processor may receive an upgrade file from the source of the upgrade. In some embodiments, the device processor may receive an upgrade of firmware of the mesh network device. In some embodiments, the device processor may receive an upgrade of an application of the mesh network device. In some embodiments, the device processor may receive an upgrade of configuration data of the mesh network device. In some embodiments, the device processor may receive an upgrade of various content stored on a mesh network device. In some embodiments, the device processor may receive the upgrade file after notifying the source of the upgrade (e.g., hub or other mesh network device within the mesh network) that the device is prepared to perform the requested upgrade based on identifying a neighbor mesh network device to function as a recovery node. Notifying the source of the upgrade that the device is prepared to perform the upgrade may trigger delivery of the device upgrade file.

In block 420, the device processor may perform the upgrade by overwriting the file currently stored in memory of the device with a file extracted from the device upgrade file without retaining a copy of the current (i.e., pre-upgrade) file in memory. That is, the device processor may perform the upgrade "in-place" by replacing (e.g., overwriting) the current file with the new file. In some embodiments, only a portion of the file currently stored in the memory may be replaced. In some embodiments, only that portion of the file to be upgraded is replaced, such as by overwriting the upgrading portions of the file in memory while leaving the rest of the current file unchanged in memory. For example, if the device upgrade file contains a new version of the file (e.g., operating software version 1.5), only the file corresponding to an existing version of the file (e.g., operating software version 1.4) may be replaced. In some embodiments, all of the file currently stored in the memory may be replaced/overwritten with the file from the device upgrade file.

In determination block 422, the device processor may determine whether the upgrade was successful. For example, the device processor may determine whether or not the device is operating with a newer version of the file. In another example, the device processor may determine whether or not the device successfully completed a reboot and whether or not the device is operating normally. In some embodiments, the device processor may not make a determination at all in this operation, and instead the device processor may either be functioning after the upgrade (in which case the upgrade was successful) or stalled/not functioning (in which case the upgrade was not successful).

In response to determining that the upgrade was successful or upon restarting operations after the upgrade (i.e., determination block 422="Yes"), the device processor may receive a challenge message from the neighbor mesh network device functioning as a recovery node in block 424, which will be received after a time specified in a timeout value expires. For example, as discussed in greater detail below, the neighbor mesh network device functioning as a recovery node may "check-in" on the device by sending the challenge message. In some embodiments, the challenge message may include information useful for authenticating the device being upgraded, such as an alphanumeric string generated by the neighbor mesh network device.

In some embodiments, the neighbor mesh network device functioning as a recovery node may encrypt the challenge message, such as by using a public key of the device being upgraded or a symmetric key shared between the two devices. In this way, the neighbor mesh network device functioning as a recovery node and the device being upgraded may ensure privacy, integrity, and authenticity of the challenge message. Therefore, in optional block 426, the device processor may decrypt the challenge message. In embodiments in which the neighbor mesh network device functioning as a recovery node encrypts the challenge message using a shared symmetric key, the device processor may decrypt the challenge message in optional block 426 using the symmetric key shared between the two devices. In embodiments in which the neighbor mesh network device functioning as a recovery node encrypts the challenge message using a public key of the device being upgraded, the device processor may decrypt the challenge message in optional block 426 using a private key of the device being upgraded.

If the challenge message included an alphanumeric string, the device processor may create a challenge response message that includes an encrypted alphanumeric string or a unique hash of the string in optional block 428. In some embodiments, the device processor may use a symmetric key shared between the device and the neighbor mesh network device functioning as a recovery node for completing this encryption.

In some embodiments, the device processor may encrypt the challenge response message in optional block 430, such as by using a public key of the neighbor mesh network device or a symmetric key shared between the two devices. By encrypting the challenge response message, the device and the neighbor mesh network device functioning as a recovery node may ensure privacy, integrity, and authenticity of the challenge response message.

In block 432, the device processor may send the challenge response message to the neighbor mesh network device functioning as a recovery node. In various embodiments, sending the challenge response message indicates to the neighbor mesh network device functioning as a recovery node that the upgrade was successful, and therefore no recovery of the device being upgraded is necessary.

In response to determining that the upgrade was not successful or as a result of being stalled due to failure of the upgrade process (i.e., determination block 422="No"), the device processor will not respond to the challenge message, and as a result may receive a recovery file from the neighbor mesh network device functioning as a recovery node in block 440. As discussed further below, the neighbor mesh network device functioning as a recovery node may determine that the upgrade was unsuccessful if a challenge response message is not received from the device.

In block 442, the device processor may store the file from the recovery file into memory of the device and complete a recovery. As discussed above, the recovery file may contain the same file as the file stored in the memory of the device prior to performing the upgrade. Thus, the recovery file may enable the device to recover to the most recently known good file. In some embodiments, the recovery file may contain only the part of the file that was to be upgraded. In some embodiments, the recovery file may contain all of the file to be stored in the memory of the device.

The method 400 enables a mesh network device to perform an upgrade without the need for extraneous memory capacity for storing a backup version of the file being upgraded. The mesh network device identifies a neighbor mesh network device to function as a recovery node in the event that the upgrade is unsuccessful. If the upgrade is unsuccessful, the neighbor mesh network device functioning as a recovery node device will determine this based on the lack of response to a challenge message, and thus the device may receive a recovery file from the neighbor mesh network device. If the upgrade is successful, the device responds to the challenge message informing the neighbor network device that recovery is unnecessary.

Figure 4B:
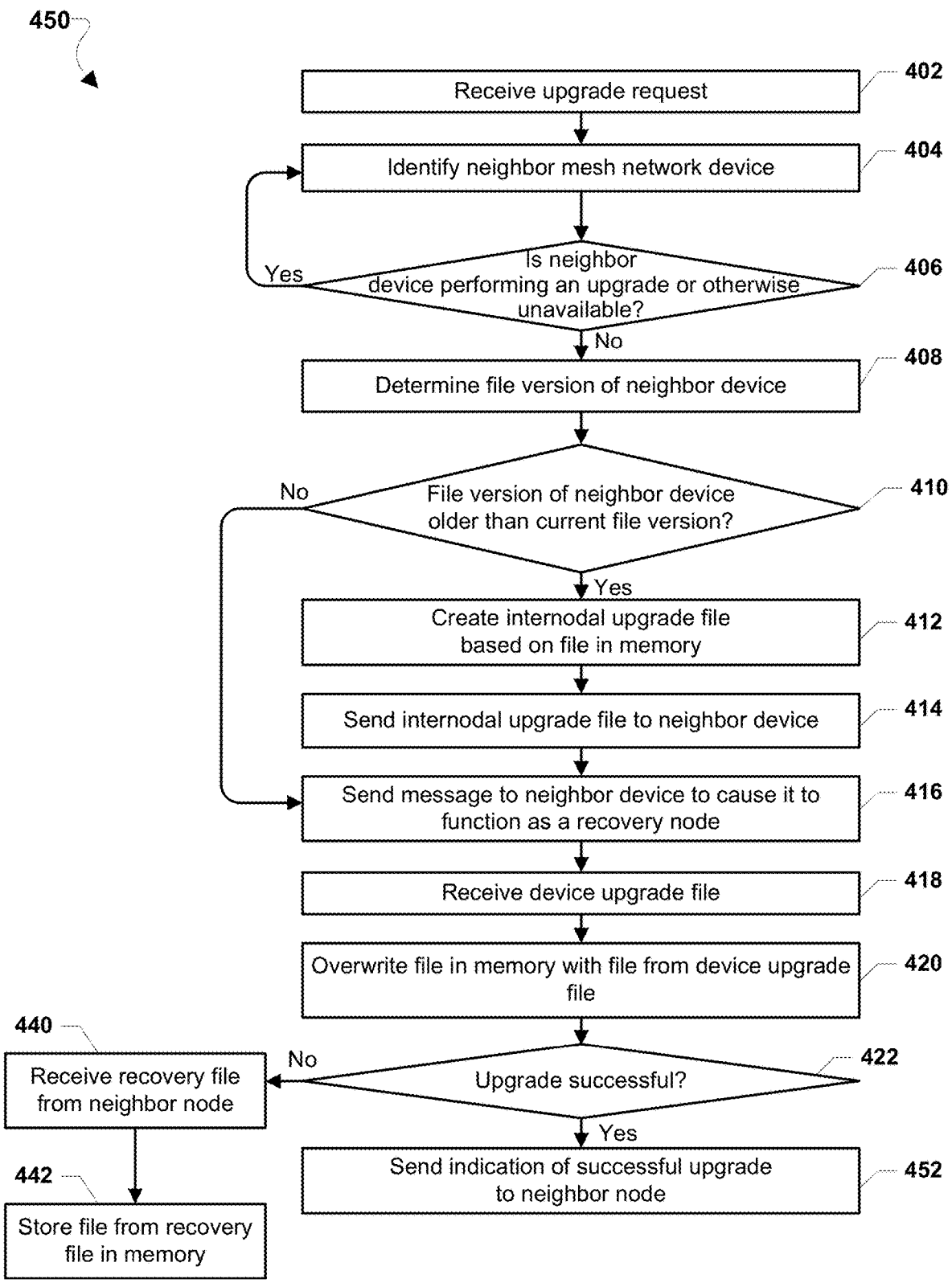
FIG. 4B is a process flow diagram illustrating an alternative method for upgrading an IoE device according to various embodiments.

FIG. 4B is a process flow diagram illustrating an alternative method 450 for upgrading a mesh network device in which the upgraded device signals the recovery node device when the upgrade is successfully completed according to some embodiments. In some embodiments, the method 450 may be implemented when upgrading firmware of the mesh network device. In some embodiments, the method 450 may be implemented when upgrading an application of the mesh network device. In some embodiments, the method 450 may be implemented when upgrading configuration data of the mesh network device. In some embodiments, the method 450 may be implemented when upgrading various content stored on a mesh network device. With reference to FIGS. 1-4B, the method 450 may be implemented by a device processor (e.g., the processor 202 or another similar processor) of an IoE device (e.g., the IoE devices 102-116 and 200).

In the method 450, operations in blocks 402-422 and 440-442 are the same as in the method 400 as described with reference to FIG. 4A. In response to determining that the upgrade is successful or upon returning to normal operations following the upgrade (i.e., determination block 422="Yes"), the device processor may send an indication of a successful upgrade to the neighbor mesh network device functioning as a recovery node device in block 452. The device processor may send this indication message promptly after completing the upgrade so that the neighbor mesh network device functioning as a recovery node device receives it before expiration of the time indicated by the timeout value sent in block 416.

Similar to the method 400, the method 450 enables a mesh network device to perform an upgrade without the need for extraneous memory capacity for storing a backup version of the file being upgraded. The mesh network device identifies a neighbor mesh network device to function as a recovery node in the event that the upgrade is unsuccessful. If the upgrade is successful, the device transmits a message informing the neighbor network device that the upgrade was successful so recovery is unnecessary. If the upgrade is unsuccessful, the neighbor mesh network device functioning as a recovery node device will determine this based on the time indicated by the timeout value expiring before receiving an indication of a successful upgrade, and thus the device being upgraded may receive a recovery file from the neighbor mesh network device.

Figure 4C:
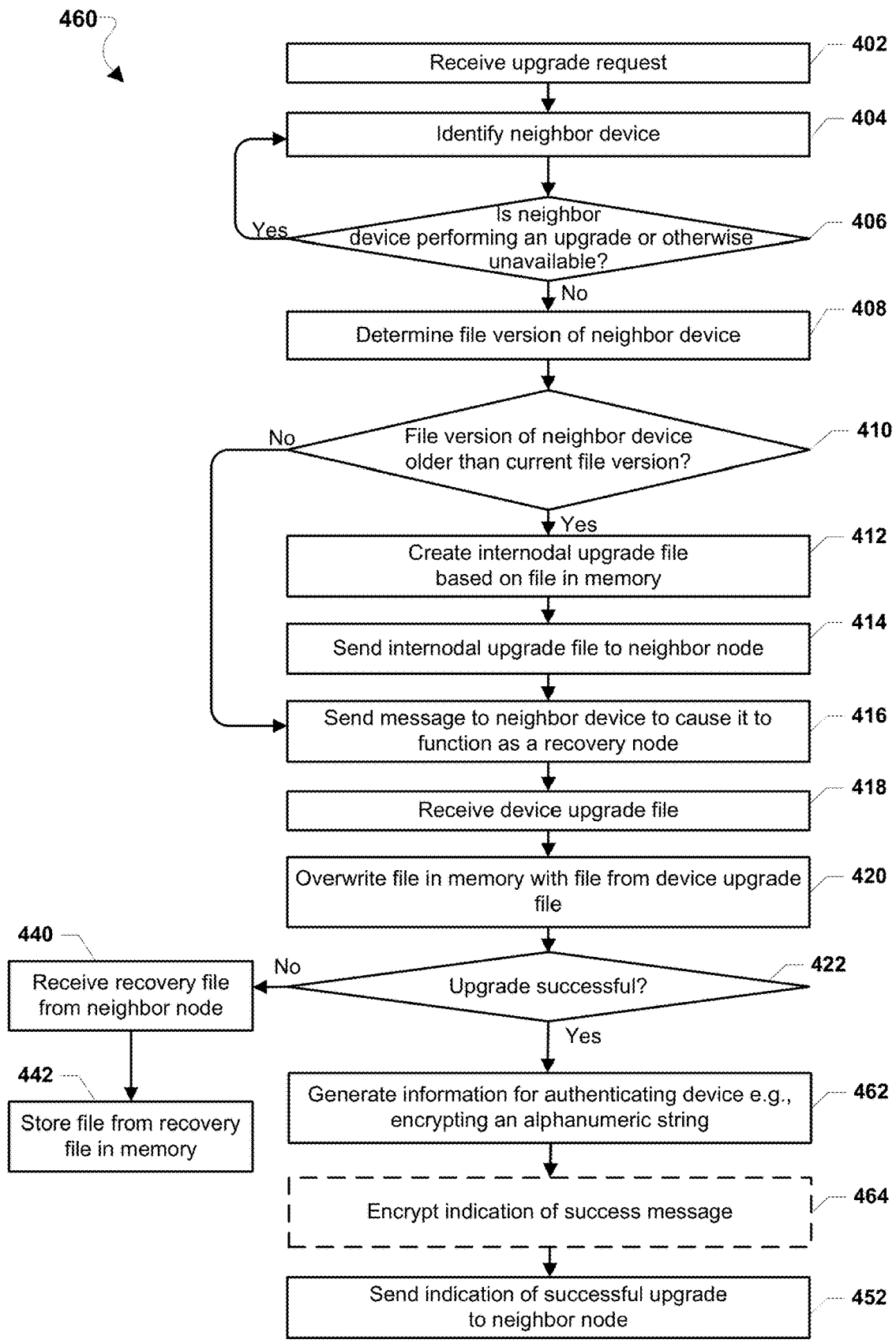
FIG. 4C is a process flow diagram illustrating another alternative method for upgrading an IoE device according to various embodiments.

FIG. 4C is a process flow diagram illustrating an alternative method 460 for upgrading a mesh network device in which the upgraded device signals the neighbor mesh network device functioning as a recovery node when the upgrade is successfully completed with information that enables a recovery node to authenticate such a signal according to some embodiments. In some embodiments, the method 460 may be implemented when upgrading firmware of the mesh network device. In some embodiments, the method 460 may be implemented when upgrading an application of the mesh network device. In some embodiments, the method 460 may be implemented when upgrading configuration data of the mesh network device. In some embodiments, the method 460 may be implemented when upgrading various content stored on a mesh network device. With reference to FIGS. 1-4C, the method 460 may be implemented by a device processor (e.g., the processor 202 or another similar processor) of an IoE device (e.g., the IoE devices 102-116 and 200).

In the method 460, operations in blocks 402-422 and 440-442 are the same as in the method 400 as described with reference to FIG. 4A. In response to determining that the upgrade is successful or upon returning to normal operations following the upgrade (i.e., determination block 422="Yes"), the device processor may generate information usable by the neighbor mesh network device functioning as a recovery node to authenticate a message as coming from the device being upgraded in block 462. In some embodiments, such information may be an alphanumeric string (or a hash of the string) that was provided by the device being upgraded to the neighbor mesh network device functioning as a recovery node in the message sent in block 416. In some embodiments, such information may be an alphanumeric string (or a hash of the string) that was provided by the neighbor mesh network device functioning as a recovery node in response to the message sent in block 416. In some embodiments, such information may be information, or a hash of information, that is mutually known to the upgrading device and the neighbor mesh network device functioning as a recovery node under the circumstances. In some embodiments, such information may also be encrypted as part of the operations in block 462.

In some embodiments, the device processor may encrypt the indication of success message before transmission in optional block 464. In some embodiments, such encryption may be accomplished using a public key that enables decryption using a private key of the neighbor mesh network device functioning as a recovery node. In some embodiments, such encryption may be accomplished using a symmetric key known to both the device being upgraded and the neighbor mesh network device functioning as a recovery node. Encrypting the indication of success message may help to ensure that upgrade and recovery methods cannot be spoofed or hacked.

The device processor may then send the indication of a successful upgrade to the neighbor mesh network device functioning as a recovery node in block 452 as described. Again, the device processor may generate and send this indication of success message promptly after completing the upgrade so that the neighbor mesh network device functioning as a recovery node receives it before expiration of the time indicated by the timeout value sent in block 416.

Similar to the methods 400 and 450, the method 460 enables a mesh network device to perform an upgrade without the need for extraneous memory capacity for storing a backup version of the file being upgraded. The mesh network device identifies a neighbor mesh network device to function as a recovery node in the event that the upgrade is unsuccessful. If the upgrade is successful, the device transmits a message that the neighbor network device functioning as a recovery node can authenticate to determine that the upgrade was successful so recovery is unnecessary. If the upgrade is unsuccessful, the neighbor mesh network device functioning as a recovery node will determine this based on the time indicated by the timeout value expiring before receiving an indication of a successful upgrade, and thus the device being upgraded may receive a recovery file from the neighbor mesh network device functioning as a recovery node.

Figure 5A:
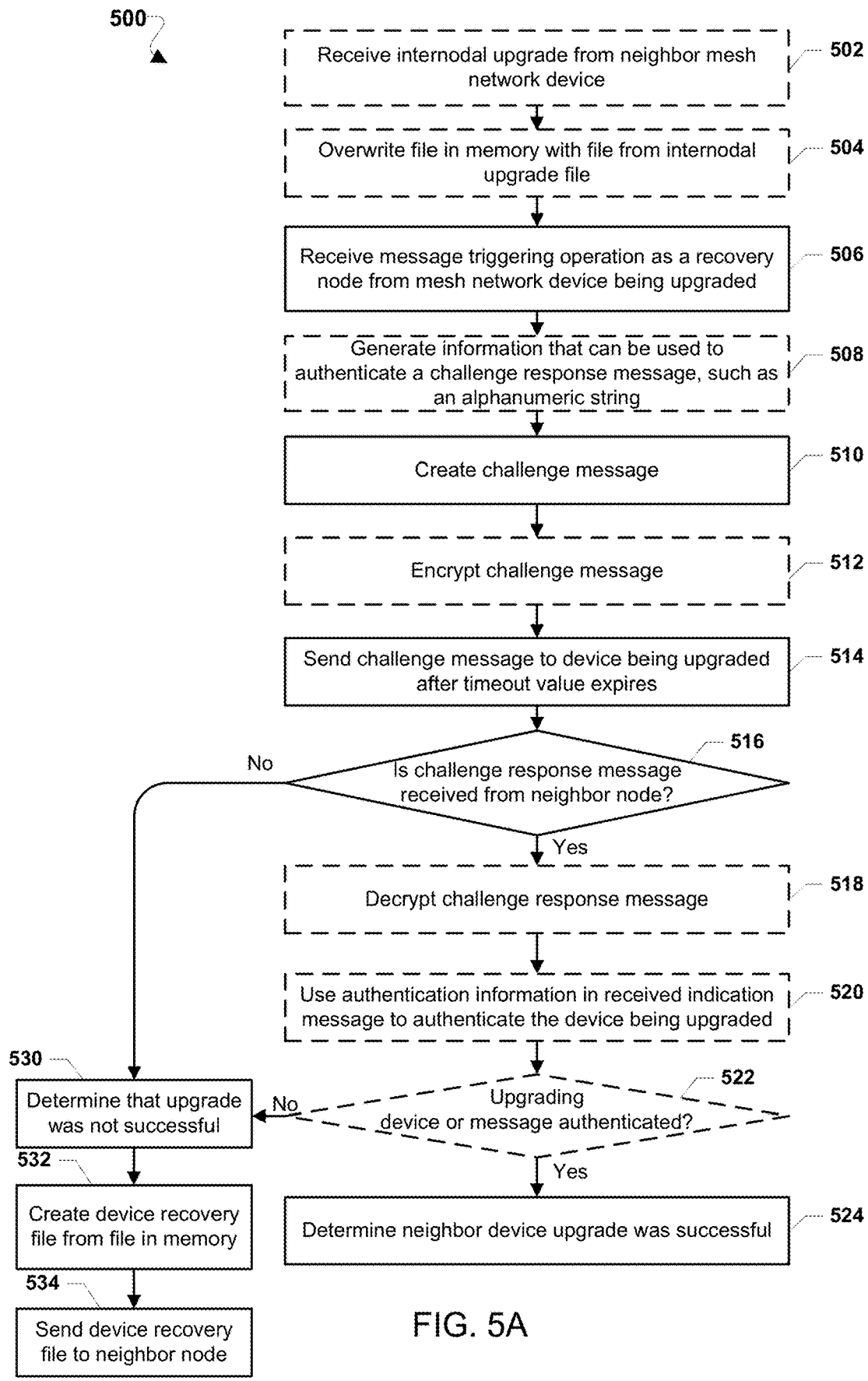
FIG. 5A is a process flow diagram illustrating a method for recovering a neighbor IoE device according to various embodiments.

FIG. 5A is a process flow diagram illustrating a method 500 for recovering a neighboring device performing an upgrade of a file (e.g., firmware, application software, configuration data, content, etc.) according to some embodiments. With reference to FIGS. 1-5A, the method 500 may be implemented by a device processor (e.g., the processor 202 or another similar processor) of a mesh network device (e.g., the IoE devices 102-116 and 200). Of note, the mesh network device performing the method 500 may be the neighbor network device functioning as a recovery node in the method 400 described with reference to FIG. 4A. That is, a mesh network device to be upgraded may perform the method 400 while a mesh network device functioning as a recovery node may perform the method 500.

In optional block 502, the device processor may receive an internodal upgrade file from a neighbor mesh network device. For example, if the file currently stored in memory of the device has an older version than the file stored in memory of a neighbor mesh network device being upgraded, the neighbor mesh network device may prompt the device to perform an upgrade by sending an internodal upgrade file. In some embodiments, the internodal upgrade file may contain only the file having a newer file version. In some embodiments, the internodal upgrade file may contain all of the file to be stored in the active memory of the device.

In optional block 504, the device processor may replace the file currently stored in the active memory of the device with the file from the internodal upgrade file. For example, the internodal upgrade file may contain version 1.4 operating software and the device processor may replace version 1.3 operating software currently stored in memory with the version 1.4 operating software.

In block 506, the device processor may receive from the neighbor mesh network device a message configured to trigger or notify the device processor to begin functioning as a recovery node. This message may include a timeout value indicating an amount of time that the device processor should wait before sending a challenge response message to the device being upgraded. In some embodiments, the message triggering or notifying the device processor to begin functioning as a recovery node may be an encrypted message. In such embodiments, the device processor may decrypt the encrypted message in block 506 using a private key linked to a public key used to encrypt the message or a symmetric key shared between the device processor and the neighbor mesh network device. In some embodiments as part of the operations in block 506, the device processor may start a timer set to the time period indicated in the timeout value.

In some embodiments, the device processor may generate information that can be used to authenticate a challenge response message from the device being upgraded in optional block 508. In some embodiments, the generated information that can be used to authenticate a challenge response message may be an alphanumeric string. In some embodiments, the generated information that can be used to authenticate a challenge response message may be a randomly generated alphanumeric string. As an example, the alphanumeric string may be 8 bytes in length, but the alphanumeric string may be longer or shorter than 8 bytes.

In block 510, the device processor may create a challenge message based on the alphanumeric string. In various embodiments, the device processor may create the challenge message by including the alphanumeric string in an information element field of the challenge message.

In optional block 512, the device processor may encrypt the challenge message. In some embodiments, the device processor may encrypt the challenge message using a public key of the neighbor mesh network device. In other embodiments, the device processor may encrypt the challenge message using a symmetric key shared between the device and the neighbor mesh network device. Encrypting the challenge message may ensure privacy, integrity, and authenticity of the challenge message.

In block 514, the device processor may send the challenge message to the device being upgraded upon expiration of the time period indicated in the timeout value. For example, the device processor may send the challenge message to the device being upgraded in response to expiration of a timer started in block 506.

In some embodiments, some or all of the operations in blocks 508-512, as well as block 514, may be performed in response to expiration of the time period indicated in the timeout value.

In determination block 516, the device processor may determine whether a challenge response message is received from the neighbor mesh network device being upgraded.

In some embodiments, in response to determining that a challenge response message is received from the device being upgraded (i.e., determination block 516="Yes"), the device processor may determine that the upgrade of the neighbor mesh network device was successful in block 524. As part of this determination, the device processor may end operations associated with functioning as a recovery node for the device upgrade.

In some embodiments, in response to determining that a challenge response message is received from the device being upgraded (i.e., determination block 516="Yes"), the device processor may perform operations to authenticate the challenge response message and/or the device sending that message in optional blocks 518-522. For example, the device processor may decrypt the challenge response message in optional block 518 in embodiments in which the challenge response message is encrypted. In optional block 520, the device processor may use information included in the challenge response message to authenticate the message or that the message was sent by the device being upgraded. For example, the device being upgraded may have generated a challenge response that includes an encrypted or hashed version of an alphanumeric string generated in optional block 508 and included in the challenge message in block 510. In optional determination block 522, the device processor may determine based on the results of the operations in block 520 whether the message or the device being upgraded is authenticated. In response to determining that the message or the device being upgraded is authenticated (i.e., determination block 522="Yes"), the device processor may determine that the neighbor mesh network device upgrade was successful in block 524 as described.

In response to determining that a challenge response message is not received from the neighbor mesh network device (i.e., determination block 516="No") or in response to determining that the message or the device being upgraded is not authenticated (i.e., optional determination block 522="No"), the device processor may determine that the device upgrade failed in block 530 and proceed to function as a recovery node by creating a device recovery file from the file in memory of the device in block 532. In some embodiments, the device processor may create the device recovery file by including all of the file currently stored in the active memory. In some embodiments, the device processor may create the device recovery file by including only part of the file that was to be upgraded by the neighbor mesh network device. For example, the device processor may include the file previously replaced by the file received in an internodal upgrade file, such as in optional block 504.

In block 534, the device processor may send the device recovery file to the neighbor mesh network device being upgraded for use in recovering that device. In various embodiments, the device may initiate a recovery of the neighbor mesh network device by sending the device recovery file.

The method 500 includes operations that enables a mesh network device to function as a recovery node to a neighbor network device performing an OTA upgrade. The mesh network device functioning as a recovery node may "check-in" on the neighbor network device after a timeout value expires and, if no response (or no authenticated response) is received indicating that the upgrade fails, the mesh network device may facilitate recovery of the device performing the upgrade by sending a device recovery file.

Figure 5B:
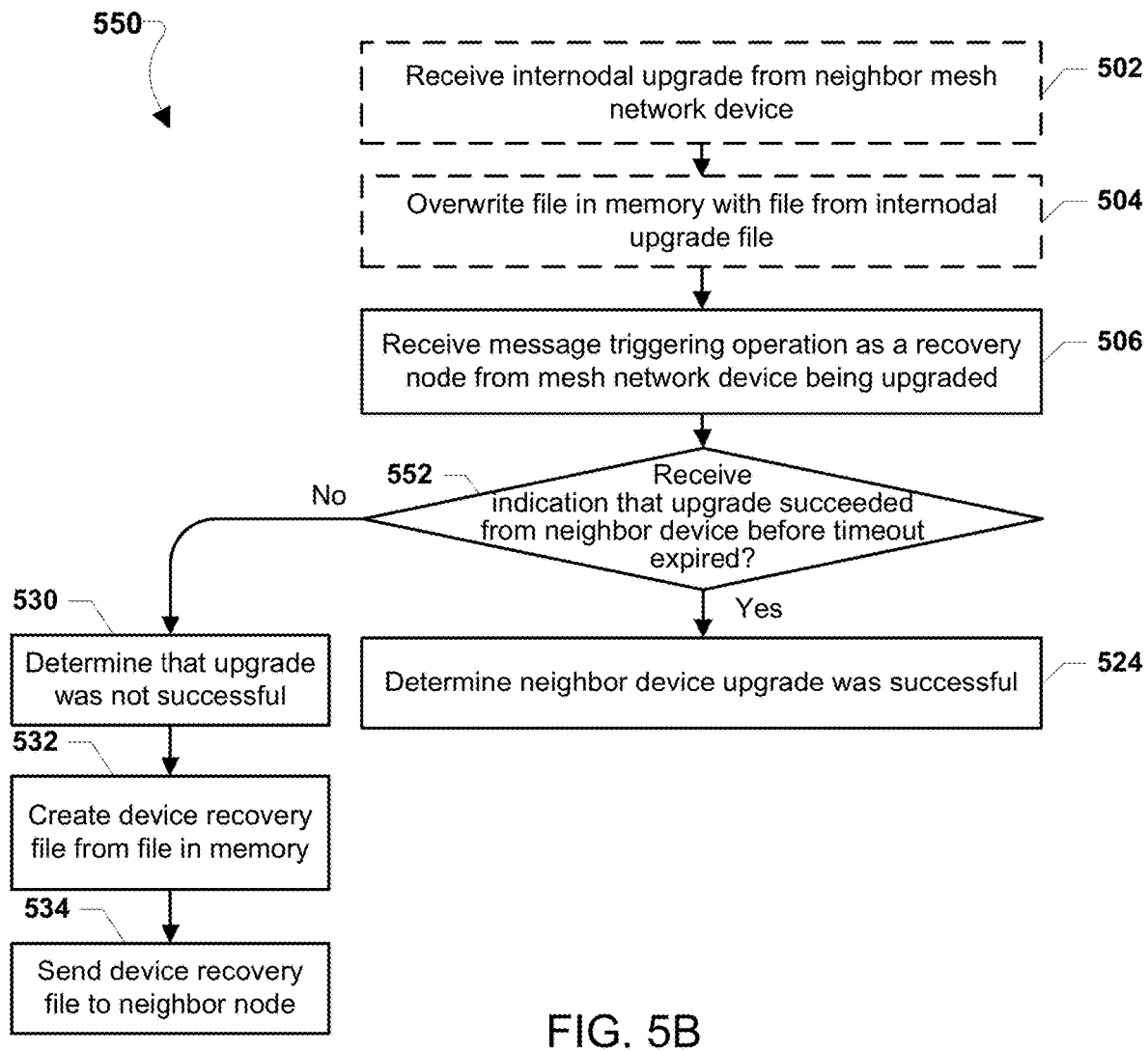
FIG. 5B is a process flow diagram illustrating an alternative method for recovering a neighbor IoE device according to various embodiments.

FIG. 5B is a process flow diagram illustrating an alternative method 550 for recovering a device performing an upgrade in which the mesh network device waits a period of time to receive an indication that the upgrade was successful and initiates the device recovery if such an indication is not received before that time expires according to some embodiments. With reference to FIGS. 1-5B, the method 550 may be implemented by a device processor (e.g., the processor 202 or another similar processor) of a mesh network device (e.g., the IoE devices 102-116 and 200). Of note, the mesh network device performing the method 550 may be the neighbor network device functioning as a recovery node in the method 450 described with reference to FIG. 4B. That is, a mesh network device to be upgraded may perform the method 450 while a mesh network device functioning as a recovery node may perform the method 550.

In the method 550, operations in blocks 502-506, 524 and 530-534 may be implemented as described in the method 500 illustrated in FIG. 5A.

In determination block 552, the device processor may determine whether an indication of a successful upgrade message is received from the device being upgraded before expiration of the time indicated in the timeout value received in block 506. For example, after receiving the message configured to trigger operation as a recovery node in block 506, the device processor may start a timer set to the timeout value and monitor for an indication of upgrade success message from the device being upgraded.

In response to expiration of the time indicated in the timeout value before receipt of an indication of a successful upgrade message (i.e., determination block 552="No"), the device processor may determine that the device upgrade failed in block 530 and proceed to function as a recovery node by creating a device recovery file from the file in memory of the device in block 532, and sending the device recovery file to the neighbor mesh network device in block 534 as described with reference to FIG. 5A.

In response to receiving an indication of a successful upgrade message before expiration of the time indicated in the timeout value (i.e., determination block 552="Yes"), the device processor may determine that the neighbor network device upgrade was successful in block 524 as described with reference to FIG. 5A.

The method 550 includes operations that enables a mesh network device to function as a recovery node to a neighbor network device performing an OTA upgrade without the need to send a challenge message. The mesh network device functioning as a recovery node may conclude that the upgrade failed and initiate a recovery of the device being upgraded if no indication of a successful upgrade message is received before the time indicated in the timeout value expires.

Figure 5C:
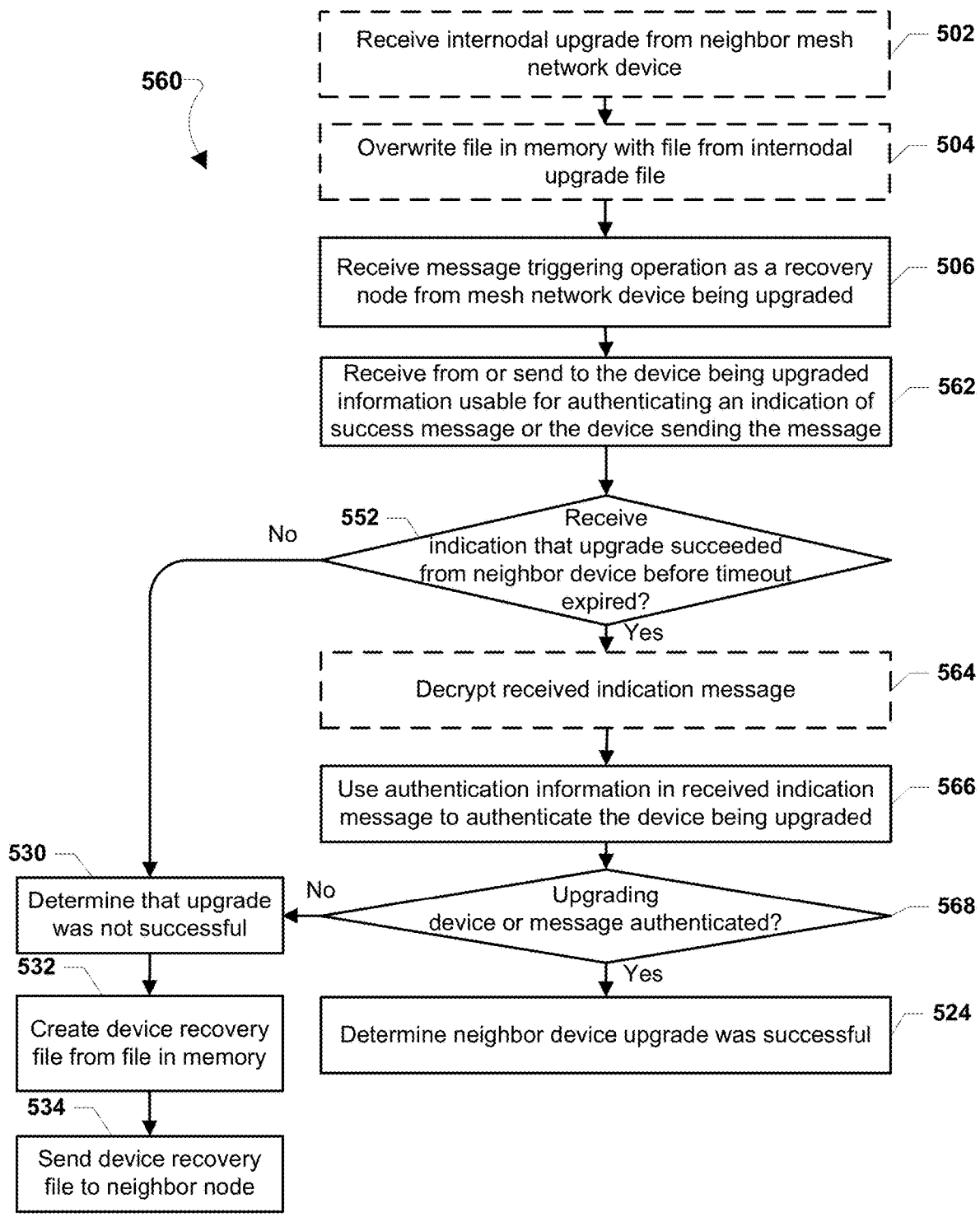
FIG. 5C is a process flow diagram illustrating another alternative method for recovering a neighbor IoE device according to various embodiments.

FIG. 5C is a process flow diagram illustrating an alternative method 560 for recovering a device performing an upgrade in which the mesh network device initiates device recovery if an indication is not received before a time expires or that such a message or the device are not authenticated according to some embodiments. With reference to FIGS. 1-5C, the method 560 may be implemented by a device processor (e.g., the processor 202 or another similar processor) of a mesh network device (e.g., the IoE devices 102-116 and 200). Of note, the mesh network device performing the method 560 may be the neighbor network device functioning as recovery node in the method 460 described with reference to FIG. 4C. That is, a mesh network device to be upgraded may perform the method 460 while a mesh network device functioning as a recovery node may perform the method 560.

In the method 560, operations in blocks 502-506, 524 and 530-534 may be implemented as described in the method 500 illustrated in FIG. 5A.

In block 562, the device processor may obtain information that will be usable for authenticating an indication of upgrade success message and/or the device sending such a message. In some embodiments, the device processor may generate the information usable for authenticating an indication of success message and/or the sending device in response to receiving the message triggering operation as a recovery device (block 506) and transmit that information to the device being upgraded. For example, the information may be an alphanumeric string that the device processor will look for in an indication of upgrade success message to authenticate the message and/or the device sending the message. In some embodiments, the device processor may receive the information usable for authenticating an indication of success message and/or the sending device from the device being upgraded. For example, the information usable for authenticating an indication of success message and/or the sending device from the device being upgraded may be included in the message triggering operation as a recovery node in block 506. In some embodiments, the device processor may identify information that is known to both the devices and that will be used by the device being upgraded in generating an indication of success message.

In determination block 552, the device processor may determine whether an indication of a successful upgrade message is received from the device being upgraded before expiration of the time indicated in the timeout value received in block 506. For example, after receiving the message configured to trigger operation as a recovery device in block 506, the device processor may start a timer set to the timeout value and monitor for an indication of upgrade success message from the device being upgraded.

In response to receiving of an indication of a successful upgrade message before expiration of the time indicated in the timeout value (i.e., determination block 552="Yes"), the device processor may decrypt the indication of success message in optional block 564 in embodiments in which the indication of success message is encrypted.

In block 566, the device processor may use information included in the indication of success message to authenticate the message or that the message was sent by the device being upgraded. For example, the device being upgraded may have generated a challenge response that includes an encrypted or hashed version of an alphanumeric string obtained in block 562. In determination block 568, the device processor may determine, based on the results of the operations in block 566, whether the message or the device being upgraded is authenticated.

In response to determining that the message or the device being upgraded is authenticated (i.e., determination block 522="Yes"), the device processor may determine that the neighbor mesh network device upgrade was successful in block 524 as described.

In response to expiration of the time indicated in the timeout value before receipt of an indication of a successful upgrade message (i.e., determination block 552="No") or in response to determining that the message or the device being upgraded is not authenticated (i.e., determination block 568="No"), the device processor may determine that the device upgrade failed in block 530 and proceed to function as a recovery node by creating a device recovery file from the file in memory of the device in block 532, and sending the device recovery file to the neighbor mesh network device in block 534 as described with reference to FIG. 5A.

The method 560 includes operations that enables a mesh network device to function as a recovery node to a neighbor network device performing an OTA upgrade without the need to send a challenge message while ensuring that an indication of successful upgrade is authentic or sent by the device being upgraded. The mesh network device functioning as a recovery node may conclude that the upgrade failed and initiate a recovery of the device being upgraded if no indication of a successful upgrade message is received before the time indicated in the timeout value expires or either an indication of successful upgrade message or the device sending such a message is not authenticated.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 450, 500 and 550 may be substituted for or combined with one or more operations of the methods 400, 450, 500 and 550.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the device processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A method of upgrading a mesh network device, comprising:
   identifying, by a processor of the mesh network device, a neighbor mesh network device suitable for functioning as a recovery node in preparation for performing an upgrade;
   sending to the neighbor mesh network device a message configured to cause the neighbor mesh network device to function as a recovery node;
   performing, by the processor of the mesh network device, the upgrade by overwriting a file in memory of the mesh network device without retaining a copy at the mesh network device;
   performing a communication with the neighbor mesh network device to determine if the upgrade was successful by transmitting an indication of upgrade success message to the neighbor mesh network device upon successfully completing the upgrade;
   determining, by a processor of the neighbor mesh network device, whether an indication of upgrade success message is received from the mesh network device before expiration of a time indicated in a timeout value;
   in response to determining that an indication of upgrade success message is not received from the mesh network device before expiration of the time indicated in the timeout value:
      sending by the processor of the neighbor mesh network device to the mesh network device a device recovery file comprising a version the same as or newer than the version of the file being upgraded; and
      using, by the processor of the mesh network device, the recovery file received from the neighbor mesh network device to overwrite the file in the memory of the mesh network device.

2. The method of claim 1, wherein identifying a neighbor mesh network device suitable for functioning as a recovery node comprises:
   determining whether the neighbor mesh network device is performing an upgrade;
   in response to determining that the neighbor mesh network device is not performing an upgrade, determining whether a version of a file stored in a memory of the neighbor mesh network device and corresponding to the upgrade by the mesh network device is older than a version of the file being upgraded; and
   initiating an upgrade of the neighbor mesh network device by the mesh network device in response to determining that the version of the file stored in the memory of the neighbor mesh network device is older than the version of the file being upgraded.

3. The method of claim 2, wherein initiating an upgrade of the neighbor mesh network device comprises sending an internodal upgrade file to the neighbor mesh network device, the internodal upgrade file comprising a copy of the file being upgraded.

4. The method of claim 1, further comprising including within the indication of upgrade success message information usable by the neighbor mesh network device for authenticating the indication of upgrade success message or the mesh network device.

5. The method of claim 1, wherein using a recovery file received from the neighbor mesh network device to overwrite a file in the memory in response to determining that the upgrade was unsuccessful comprises:
   receiving a device recovery file from the neighbor mesh network device functioning as a recover node, the device recovery file comprising a file having a version the same as or newer than the version of the file being upgraded; and
   recovering the mesh network device by overwriting the file from the device recovery file in a memory of the mesh network device.

6. A method of recovering a neighbor mesh network device performing an upgrade, comprising:
   receiving, by a processor of a mesh network device, a message configured to cause the mesh network device to function as a recovery node for a neighbor mesh network device, wherein the message comprises a timeout value;
   determining whether an upgrade of the neighbor mesh network device succeeded based upon receiving an indication of upgrade success message from the neighbor mesh network device before expiration of the time indicated in the timeout value;
   attempting to authenticate the indication of upgrade success message or the neighbor mesh network device using information included in the indication of upgrade success message;
   determining that the upgrade of the neighbor mesh network device did not succeed in response to not authenticating the indication of upgrade success message or the neighbor mesh network device; and
   sending a device recovery file to the neighbor mesh network device in response to determining that the upgrade of the neighbor mesh network device did not succeed.

7. The method of claim 6, wherein sending a device recovery file to the neighbor mesh network device comprises:
   creating the device recovery file comprising a file corresponding to the upgrade by the neighbor mesh network device; and
   sending the device recovery file to the neighbor mesh network device.

8. A mesh network device, comprising:
   a memory; and
   a processor coupled to the memory and configured with processor-executable instructions to perform operations comprising:

identifying a neighbor mesh network device suitable for functioning as a recovery node in preparation for performing an upgrade;

sending to the neighbor mesh network device a message configured to cause the neighbor mesh network device to function as a recovery node;

performing the upgrade by overwriting a file in the memory without retaining a copy;

performing a communication with the neighbor mesh network device to determine if the upgrade was successful by transmitting an indication of upgrade success message to the neighbor mesh network device upon completing the upgrade of the file, wherein the indication of upgrade success message includes information usable by the neighbor mesh network device for authenticating the indication of upgrade success message or the mesh network device; and using a recovery file received from the neighbor mesh network device to overwrite the file in the memory in response to determining that the upgrade was unsuccessful.

9. The mesh network device of claim 8, wherein the processor is configured with processor-executable instructions to perform operations such that identifying a neighbor mesh network device suitable for functioning as a backup memory comprises:

determining whether the neighbor mesh network device is performing an upgrade;

in response to determining that the neighbor mesh network device is not performing an upgrade, determining whether a version of a file stored in a memory of the neighbor mesh network device and corresponding to the upgrade by the mesh network device is older than a version of the file being upgraded; and initiating an upgrade of the neighbor mesh network device by the mesh network device in response to determining that the version of the file stored in the memory of the neighbor mesh network device is older than the version of the file being upgraded.

10. The mesh network device of claim 9, wherein the processor is configured with processor-executable instructions to perform operations further comprising initiating an upgrade of the neighbor mesh network device by sending an internodal upgrade file to the neighbor mesh network device, the internodal upgrade file comprising the file being upgraded.

11. The mesh network device of claim 8, wherein the processor is configured with processor-executable instructions to perform operations such that performing a communication with the neighbor mesh network device to determine if the upgrade was successful comprises:

receiving a challenge message from the neighbor mesh network device; and transmitting a challenge response message to the neighbor mesh network device in response to receiving the challenge message.

12. The mesh network device of claim 11, wherein the processor is configured with processor-executable instructions to perform operations further comprising including within the challenge response message information usable by the neighbor mesh network device for authenticating the challenge response message or the mesh network device.

13. The mesh network device of claim 8, wherein the processor is further configured with processor-executable instructions to perform operations such that using a recovery file received from the neighbor mesh network device to overwrite the file in the memory in response to determining that the upgrade was unsuccessful comprises:

receiving a device recovery file from the neighbor mesh network device, the device recovery file comprising a version the same as or newer than the version of the file being upgraded; and recovering the mesh network device by overwriting the file from the device recovery file in the memory.

14. A mesh network device, comprising:

a memory; and a processor coupled to the memory and configured with processor-executable instructions to perform operations comprising:

receiving, from a neighbor mesh network device, a message configured to cause the mesh network device to function as a recovery node, wherein the message comprises a timeout value;

determining whether an upgrade of the neighbor mesh network device succeeded based upon receiving an indication of upgrade success message from the neighbor mesh network device before expiration of the time indicated in the timeout value;

attempting to authenticate the indication of upgrade success message or the neighbor mesh network device using information included in the indication of upgrade success message;

determining that the upgrade of the neighbor mesh network device did not succeed in response to not authenticating the indication of upgrade success message or the neighbor mesh network device; and sending a device recovery file to the neighbor mesh network device in response to determining that the upgrade of the neighbor mesh network device did not succeed.

15. The mesh network device of claim 14, wherein the processor is configured with processor-executable instructions to perform operations such that sending a device recovery file to the neighbor mesh network device comprises:

creating the device recovery file comprising a file corresponding to the upgrade by the neighbor mesh network device; and sending the device recovery file to the neighbor mesh network device.

* * * * *